US010554682B2

(12) United States Patent
Greenshpan et al.

(10) Patent No.: US 10,554,682 B2
(45) Date of Patent: Feb. 4, 2020

(54) DETECTING AND REMOVING INJECTED ELEMENTS FROM CONTENT INTERFACES

(71) Applicant: Namogoo Technologies Inc., Ra'anana (IL)

(72) Inventors: Ohad Greenshpan, Ra'anana (IL); Chemi Katz, Ra'anana (IL)

(73) Assignee: Namogoo Technologies Ltd., Ra'Anana (IL)

( * ) Notice: Subject to any disclaimer, the term of this patent is extended or adjusted under 35 U.S.C. 154(b) by 96 days.

(21) Appl. No.: 15/382,903

(22) PCT Filed: Jul. 31, 2015

(86) PCT No.: PCT/IB2015/001297
§ 371 (c)(1),
(2) Date: Dec. 19, 2016

(87) PCT Pub. No.: WO2016/016712
PCT Pub. Date: Feb. 4, 2016

(65) Prior Publication Data
US 2018/0219910 A1 Aug. 2, 2018

Related U.S. Application Data

(60) Provisional application No. 62/031,284, filed on Jul. 31, 2014, provisional application No. 62/031,285, filed on Jul. 31, 2014.

(51) Int. Cl.
*H04L 29/06* (2006.01)
*G06Q 30/02* (2012.01)

(52) U.S. Cl.
CPC ..... *H04L 63/1441* (2013.01); *G06Q 30/0277* (2013.01)

(58) Field of Classification Search
CPC . H04L 63/1441; H04L 63/1416; H04L 63/14; H04L 63/168; H04L 29/06;
(Continued)

(56) References Cited

U.S. PATENT DOCUMENTS 8,056,134 B1  11/2011 Ogilvie
8,555,391 B1  10/2013 Demir et al.
(Continued)

OTHER PUBLICATIONS

Raj Chandel's Blog, Hacking Articles, https://www.hackingarticles.in/beginner-guide-html-injection/, Sep. 2017, hackingarticles, pp. 1-11.*
(Continued)

*Primary Examiner* — Abu S Sholeman
*Assistant Examiner* — Raied A Salman
(74) *Attorney, Agent, or Firm* — Lowenstein Sandler LLP

(57) ABSTRACT

Systems and methods are disclosed for detecting and removing injected elements from content interfaces. In one implementation, a processing device receives a content interface from a content provider, processes the content interface to identify elements of the interface that may not have been received from the content provider, compares the content interface with corresponding reference interfaces to identify elements of the content interface that are not present in the reference interfaces, processes the identified elements to determine how the identified elements affect a rendering of the content interface on the device, and modifies a rendering of the content interface on the device based on the manner in which the identified elements affect the rendering of the content interface on the device.

18 Claims, 7 Drawing Sheets

(58) Field of Classification Search
CPC ...... G06F 21/565; G06F 21/56; G06F 21/566; G06F 21/16; G06Q 30/0277
USPC ........... 726/11, 1, 13, 22–33; 705/44, 14.49; 713/200; 715/738; 709/225, 206, 249, 709/89
See application file for complete search history.

(56) References Cited

U.S. PATENT DOCUMENTS

| | | | |
|---|---|---|---|
| 8,601,581 | B2 | 12/2013 | Wenzinger et al. |
| 8,863,279 | B2* | 10/2014 | McDougal .......... H04L 63/1416 713/188 |
| 9,270,691 | B2* | 2/2016 | Klein .................... G06F 21/565 |
| 9,424,424 | B2* | 8/2016 | Klein .................... G06F 21/56 |
| 2007/0174915 | A1* | 7/2007 | Gribble .................. G06F 21/53 726/24 |
| 2010/0005403 | A1* | 1/2010 | Rozmaryn ............. G06Q 30/02 715/760 |
| 2011/0219450 | A1 | 9/2011 | McDougal et al. |
| 2011/0239300 | A1* | 9/2011 | Klein .................... G06F 21/565 726/23 |
| 2012/0030013 | A1* | 2/2012 | Tsay ...................... G06F 16/954 705/14.49 |
| 2012/0124372 | A1* | 5/2012 | Dilley ................. H04L 67/2819 713/162 |
| 2012/0158626 | A1 | 6/2012 | Zhu et al. |
| 2012/0255012 | A1* | 10/2012 | Sallam .................... G06F 21/52 726/24 |
| 2012/0304295 | A1 | 11/2012 | Reumann et al. |
| 2013/0007870 | A1* | 1/2013 | Devarajan .......... H04L 63/1416 726/11 |
| 2013/0031459 | A1* | 1/2013 | Khorashadi ......... G06F 17/2247 715/234 |
| 2014/0283038 | A1* | 9/2014 | Call .................... H04L 63/1441 726/22 |
| 2015/0033341 | A1* | 1/2015 | Schmidtler ......... H04L 63/1425 726/23 |
| 2016/0142428 | A1* | 5/2016 | Pastore ............... H04L 63/1466 726/23 |
| 2016/0226900 | A1* | 8/2016 | Fajardo Verano ...... G06F 21/55 |
| 2017/0063923 | A1* | 3/2017 | Yang .................. H04L 63/1483 |
| 2017/0126719 | A1* | 5/2017 | Mason ................ G06F 17/2247 |
| 2019/0272376 | A1* | 9/2019 | Woland ............... H04L 63/1416 |

OTHER PUBLICATIONS

International Search Report and Written Opinion for PCT/IB15/01297 dated Jan. 11, 2016, 7 pages.
International Search Report for PCT Patent Application No. PCT/IB15/01297 dated Jan. 11, 2016, 7 pages.
EP Search Report for EP15828312.7 dated Jan. 9, 2018, 3 pages.
European Patent Office, Supplementary European Search Report (SESR) for European Patent Application No. EP15828312, dated Nov. 22, 2017, 3 pages.

\* cited by examiner

```
<html
xmlns="http://www.w3.org/1999/xhtml"
lang="en" xml:lang="en" class="iframe_class">
<head>
<body>
<div style="width: 0px; height: 0px;"/>
<iframe id="iframe_name" style="width: 0px;
height: 0px;"/>
<script type="text/javascript"
src="www.x.com/y.js"/>
...
</body>
</html>
```

```
<html xmlns="http://www.w3.org/1999/xhtml"
lang="en" xml:lang="en" class="iframe_class">
<head>
<body>
<div style="z-index: 9999999999;width: 0px; height:
0px;"/>
<iframe id="iframe_name" style="width: 0px; height:
0px;"/>
<script type="text/javascript"
src="www.x.com/y.js"/>
...
</body>
</html>
```

```
<html xmlns="http://www.w3.org/1999/xhtml"
lang="en" xml:lang="en" class="iframe_class">
<head>
<body>
    <div style="width: 0px; height 0px;"/>
    310
    <div at="a" style="width: 0px; height:
    0px;"/>
    <iframe id="iframe_name" style="width: 0px; height:
    0px;"/>
    <script type="text/javascript"
    src="www.x.com/y.js"/>
    ...
</body>
</html>
```

FIG. 3D

```
<html xmlns="http://www.w3.org/1999/xhtml" lang="en"
xml:lang="en" class="iframe_class">
<head>
<body>
<div style="width: 0px; height: 0px;"/>
<iframe id="iframe_name" style="width: 0px; height: 0px;"/>
<script type="text/javascript" src="www.adserver.com/y.js"/>
...
</body>
</html>
```

```
<html xmlns="http://www.w3.org/1999/xhtml"
lang="en" xml:lang="en" class="iframe_class">
<head>
<body>
<div style="width: 0px; height: 0px;"/>
<iframe id="iframe_name" style="width: 0px; height:
0px; visibility:hidden"/>
<script type="text/javascript"
src="www.x.com/y.js"/>
...
</body>
</html>
```

FIG. 4A

```
<html xmlns="http://www.w3.org/1999/xhtml"
lang="en" xml:lang="en" class="iframe_class">
<head>
<body>
<div style="width: 0px; height: 0px;"/>
<iframe id="iframe_name" style="width: 0px;
height: 0px;"/>
<script type="text/javascript"
src="www.x.com/y.js"/>
...
</body>
</html>
```

FIG. 4B

```
<html xmlns="http://www.w3.org/1999/xhtml"
lang="en" xml:lang="en" class="iframe_class">
<head>
<body>
<div style="width: 0px; height: 0px;"/>
<iframe id="iframe_name" style="width: 0px; height:
0px;"/>
<script type="text/javascript"
src="www.x.com/y.js"/>
...
</body>
</html>
```

FIG. 4C

```
<html xmlns="http://www.w3.org/1999/xhtml"
lang="en" xml:lang="en" class="iframe_class">
<head>
<body>
<div style="width: 0px; height: 0px;"/>
<iframe id="iframe_name" style="width: 0px; height:
0px;"/>
<script type="text/javascript"
src="www.x.com/y.js"/>
...
</body>
</html>
```

FIG. 4D

DETECTING AND REMOVING INJECTED ELEMENTS FROM CONTENT INTERFACES

CROSS-REFERENCE TO RELATED APPLICATIONS

This application is a national phase of International Application No. PCT/IB2015/001297, filed on Jul. 31, 2015, which claims the benefit of U.S. Provisional Application No. 62/031,285, filed Jul. 31, 2014, and U.S. Provisional Application No. 62/031,284, filed Jul. 31, 2014, each of which is incorporated herein by reference in its respective entirety.

TECHNICAL FIELD

Aspects and implementations of the present disclosure relate to data processing, and more specifically, to detecting and removing injected elements from content interfaces.

BACKGROUND

The injection of unauthorized code into a webpage by third-party services (commonly referred to as 'malware') can cause significant disruption to users and create significant security threats.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a content interface from a content provider. The processing device processes the content interface as rendered on a device to identify one or more elements of the content interface as rendered on the device that was potentially not received from the content provider. The processing device compares the content interface as rendered on the device with one or more corresponding reference interfaces to identify at least one of the one or more elements of the content interface as rendered on the device that are not present in the one or more corresponding reference interfaces. The processing device processes the at least one of the one or more elements of the content interface as rendered on the device that is not present in the one or more corresponding reference interfaces to determine a manner in which the one or more elements of the content interface as rendered on the device that are not present in the one or more corresponding reference interfaces affects a rendering of the content interface on the device. The processing device modifies a rendering of the content interface on the device based on the manner in which the one or more elements of the content interface as rendered on the device that are not present in the one or more corresponding reference interfaces affects the rendering of the content interface on the device.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3A depicts exemplary HTML code corresponding to a content interface (e.g., a webpage), in accordance with one implementation of the present disclosure.

FIG. 3B depicts exemplary HTML code corresponding to a content interface (e.g., a webpage), in accordance with one implementation of the present disclosure.

FIG. 3C depicts exemplary HTML code corresponding to a content interface (e.g., a webpage), in accordance with one implementation of the present disclosure.

FIG. 3D depicts exemplary HTML code corresponding to a content interface (e.g., a webpage), in accordance with one implementation of the present disclosure.

FIG. 4A depicts exemplary HTML code corresponding to a content interface (e.g., a webpage), in accordance with one implementation of the present disclosure.

FIG. 4B depicts exemplary HTML code corresponding to a content interface (e.g., a webpage), in accordance with one implementation of the present disclosure.

FIG. 4C depicts exemplary HTML code corresponding to a content interface (e.g., a webpage), in accordance with one implementation of the present disclosure.

FIG. 4D depicts exemplary HTML code corresponding to a content interface (e.g., a webpage), in accordance with one implementation of the present disclosure.

DETAILED DESCRIPTION

Aspects and implementations of the present disclosure are directed to detecting and removing injected elements from content interfaces. The systems and methods disclosed can be implemented in technologies including various methods and systems for processing, analyzing, etc., content interface(s) (e.g., webpages, applications, etc.) in order to identify the presence of third-party elements (e.g., 'malware') that have been injected into such content interface(s). Upon identifying such third-party elements, various treatment techniques can be employed which can, for example, neutralize such third-party element(s) such that the elements do not interfere with/adversely affect the rendering of the content interface and/or the ability of a user to view, interact, etc., with it. In neutralizing such third-party elements, in certain implementations the code associated with such elements may be maintained within the content interface (e.g., by modifying parameters associated with such elements to make them invisible), such that it may be difficult and/or impossible for the third-party services responsible for the injection of such third-party elements to determine that the effects of such elements have been neutralized.

Among the technologies described herein are techniques for detecting/identifying the presence of third-party elements (e.g., 'malware') within a content interface (e.g., a webpage, mobile application, etc.) as well as techniques for treating, neutralizing, removing, etc., such identified third-party elements. In certain implementations, the referenced detection techniques can be configured to compare certain elements within a content interface (and/or characteristics, attributes, and/or values thereof) with corresponding elements/attributes/values from reference interfaces and/or rules files (which can, for example, list characteristics, attributes, etc., that correspond to third-party elements) in order to detect the presence of such third-party elements. Such comparison can be employed, for example, in lieu of comparing the entirety of a content interface (e.g., a webpage) with corresponding reference interfaces. In comparing such elements, characteristics, attributes, values, etc., the described detection techniques (and related operations) can be performed quickly and efficiently, without adding much if any delay to the rendering/loading of the content interface and without considerable additional processing overhead and/or network bandwidth demands.

Figure 1:
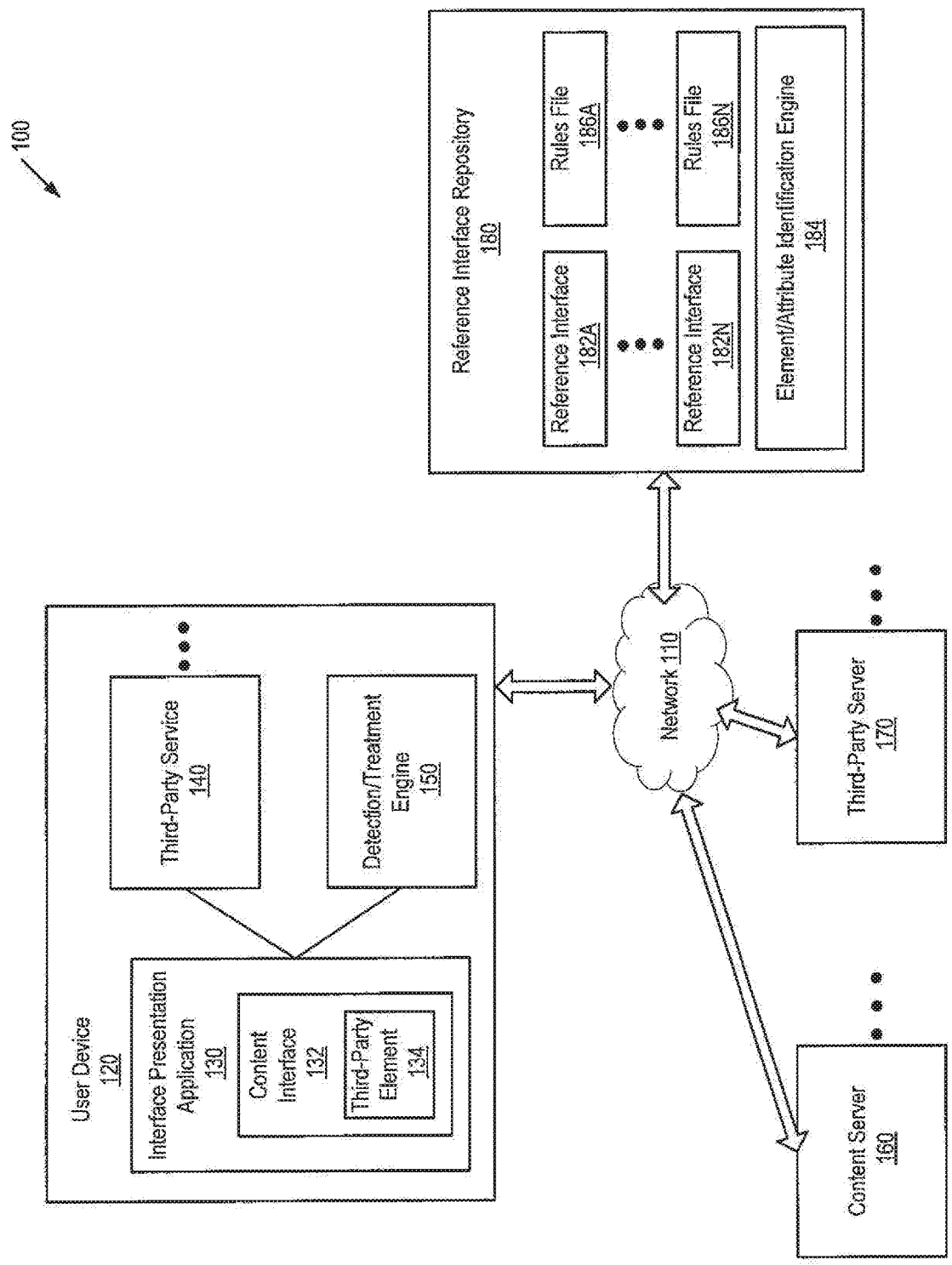
FIG. 1 depicts an illustrative system ·architecture, in accordance with one implementation of the present disclosure.

FIG. 1 depicts an illustrative system architecture 100, in accordance with one implementation of the present disclosure. The system architecture 100 includes user devices 120, content server 160, third-party server 170, and reference interface repository 180. These various elements or components can be connected to one another via network 110, which can be a public network (e.g., the Internet), a private network (e.g., a local area network (LAN) or wide area network (WAN)), or a combination thereof.

User device 120 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. Various applications, such as interface presentation application 130 may run or execute on the user device (e.g., on the operating system (OS) of the user device). In certain implementations, user device 120 can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc.

Interface presentation application 130 can be an application or service that executes on user device 120, e.g., in response to a selection or activation of the application. In certain implementations, interface presentation application 130 can receive content (e.g., content interface 132, which can be, for example, a webpage, a mobile application interface, etc.) from various sources (e.g., via network 110) and can provide/present such content in conjunction with various content presentation interfaces of the device (e.g., a display, speakers, etc.). Examples of interface presentation application 130 include but are not limited to: an HTML/web browser, an application/'app' (e.g., a desktop or mobile app), etc., a media presentation interface/application (e.g., as executing on a television, 'smart TV,' cable box, media server, etc.), and/or any other such application or service that provides/presents content.

User device 120 can also include or incorporate third-party service 140. Third-party service 140 can be, for example, an application, service, registry entry, or script that can affect, interrupt, or otherwise intrude on the operation of various aspects of user device 120 and/or interface presentation application 130 (e.g., a web browser), such as by modifying content being presented by inserting or 'injecting' code (e.g., a tag, HTML code, inline frames ('iframes'), scripts (e.g., JavaScript code, some other type of interface, file or code, image, text or hyperlink, etc.) into the presented content. In doing so, third-party service 140 can cause interface presentation application 130 to present content that is not consistent with the actual content requested by the user device and/or provided by a content provider (e.g., content server 160). Examples of third-party service 140 include but are not limited to 'malware,' 'injectors,' 'client-side injected malware,' and/or any other such application, service, etc., that affects the manner in which content is presented. For example, in FIG. 1 depicts interface presentation application 130 (e.g., a web browser) presenting content interface 132 (e.g., a webpage) within which a third-party element 134 (e.g., an iframe, script, etc.) has been injected. It should be understood that the term 'third-party' is exemplary as, in certain implementations, the referenced service may be native (e.g., installed/embedded within the operating system of the device). Accordingly, the term 'third-party service' as used herein should be understood to refer to any service that provides/enables the functionality/operations described herein.

User device 120 can also include or incorporate detection/treatment engine 150. Detection/treatment engine 150 can be, for example, an application, service, registry entry, script, and/or any other such application, service, file, command, operation, etc. that can detect and/or identify the presence and/or operation of third-party service 140, such as based on an analysis of a content interface 132 (e.g., a webpage, etc.) as perceived, presented, rendered, loaded, etc., on user device 120, such as in a manner described in detail herein. Additionally, in certain implementations, upon detecting/identifying the presence and/or operation of third-party service 140, detection/treatment engine 150 can further provide various treatments, such as may neutralize or remove the effects of third-party element 134 and/or third-party service 140, such as in a manner described in detail herein. In doing so, detection/treatment engine 150 can enable interface presentation application 130 to present content that is consistent with the actual content requested by the user device and/or provided by a content provider (e.g., content server 160).

It should be understood that in certain implementations detection/treatment engine 150 can be a tag (or other such element) that can be provided by content server 160 (e.g., a webserver) together/in conjunction with a content interface (e.g., a webpage) that is provided to the user device. Such a tag can, for example, be provided in the header associated with a webpage/HTTP request/response (e.g., one or more HTTP header fields). Accordingly, when the content interface 130 is perceived (e.g., processed), loaded, rendered (e.g., by interface presentation application 130), the tag can request/retrieve an element (e.g., one or more rules file(s) 186, such as a JavaScript file), such as from reference interface repository 180. As described in detail herein, such rules file(s) 186 can contain characteristics, parameters, elements, attributes, etc., that can indicate that a third-party element 134 (e.g., 'malware') is (or is not) present within a content interface 132 (e.g., a webpage). Using the received rules file(s) 186, detection/treatment engine 150 can identify/detect third-party elements within a content interface being loaded/rendered and can further neutralize/remove such elements, such as in a manner described herein.

Content server 160 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. In certain implementations, content server 160 can receive content requests from user device 120, such as in conjunction with interface presentation application 130 and can provide the requested content (e.g., via network 110). Examples of content server 160 include but are not limited to: a webserver, an application server, a media server, and/or any other such service, device, or application capable of storing and providing content.

Third-party server 170 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. In certain implementations, third-party server 170 can receive content requests from user device 120 based on elements (e.g., 'malware') injected into content interfaces (e.g., webpages) presented in interface presentation application 130. For example, third-party server 170 can be an ad server that provides advertisements in response to requests that originate from iframes, scripts, code, etc. that are not present in the original content interface provided to user device 120 by content server 160 but which are injected into such content interface, such as by third-party service 140.

Reference interface repository 180 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer/system, any combination of the above, or any other such computing device capable of implementing the various features described herein. Additionally, in certain implementations reference interface repository 180 can include or otherwise incorporate one or more storage devices, such as main memory, magnetic or optical storage based disks, tapes or hard drives, NAS, SAN, and so forth. In some implementations, reference interface repository 180 can be a network-attached file server, while in other implementations reference interface repository 180 can be some other type of persistent storage such as an object-oriented database, a relational database, and so forth.

As described in detail herein, reference interface repository 180 can include, for example, various data or content items, such as reference interfaces 182A-N. In certain implementations, each reference interface 182 can include an original copy/record of a content interface (e.g., a webpage) (and/or attributes, characteristics, etc., thereof), such as a copy of the content interface originating from content server 160. In certain implementations certain reference interfaces 182A-N can be provided (e.g., uploaded) by content server 160 to reference interface repository 180, while in other implementations various tools and/or applications (such as may execute on reference interface repository 180 can 'crawl' the content stored on content server 160 in order to generate reference interfaces 182A-N. Such crawled content interfaces (e.g., webpages) can then be stored in reference interface repository 180.

Element/attribute identification engine 184 can be, for example, an application, service, etc. that can process/ analyze and/or identify reference interfaces 182A-N, such as in order to identify/determine various elements, attributes, etc., associated with the reference interfaces 182, such as in a manner described in detail herein. In certain implementations, those elements, attributes, etc., identified within reference interface(s) originating from content server (which can be determined to be 'pristine' and thus free of potentially malicious elements, such as may be injected by third party service 140 into a content interface as rendered/presented on user device 120) can reflect how the content interface should be loaded, rendered, and/or presented (that is, without interference from third-party elements 134).

Element/attribute identification engine 184 can also generate and update various rules files 186A-N. Such rules files 186 (which can be, for example, JavaScript files) can contain characteristics, parameters, elements, attributes, etc. (and/or composite characteristics thereof, e.g., 'fingerprints' of third-party elements), that can indicate/reflect that a third-party element (e.g., 'malware') is present within a content interface (e.g., a webpage). In certain implementations such rules files can be associated with specific websites/webpages, while in other implementation such rules files can be more universally applicable (e.g., configured to identify third-party elements within many or any webpages). As noted, in certain implementations one or more rules file(s) can be provided to user device 120, such as in response to a request from detection/treatment engine 150. It should be noted that, in certain implementations, such rules file(s) 186 can include both a 'blacklist' of various attributes, elements, parameters, characteristics, etc., which, if identified in a content interface, are likely to indicate the presence of a third-party element (together with, in certain implementations, one or more treatment techniques which can be employed to neutralize/remove such elements) as well as a 'whitelist' of various attributes, elements, parameters, characteristics, etc., which, if identified in a content interface, are unlikely to indicate the presence of a third-party element (e.g., known/determined 'safe' or 'legitimate' elements). Additionally, in certain implementations element/attribute identification engine 184 can be updated over time. For example, detection/treatment engine 150 can provide feedback and updates to element/attribute identification engine 184 reflecting, for example, characteristics, attributes, etc., of third party elements that are being injected into content interfaces (which may change from time to time) and element/attribute identification engine 184 can modify the appropriate rules file(s) 186 to reflect such updates.

It should be noted that the depicted and described system architecture is exemplary and that in some implementations, various components may run on different and/or separate machines than as depicted and/or described herein. For example, while FIG. 1 depicts detection/treatment engine 150 executing on user device, in other implementations detection/treatment engine 150 (and/or functions/operations thereof) can be configured to execute on content server 160 and/or reference interface repository 180. Moreover, some operations of certain of the components are described in more detail herein.

It should also be noted that while FIG. 1 depicts third-party service 140, content server 160, and third-party server 170, such depiction is for the sake of clarity and brevity. However, in various scenarios (such as those described herein), any number of additional third-party services, content servers, and third-party servers (as well as any other elements/components depicted and/or described herein), may also be present. For example, several third-party services may be present on user device 120, each of which may request content from a different third-party server. Additionally, in certain implementations various elements/components depicted and/or described herein can be combined, such as within a single component/system. For example, in certain implementations user device 120 can incorporate features of reference interface repository 180. Moreover, some operations of certain of the components are described in more detail below.

As described in detail herein, various technologies are disclosed that, for example, process, analyze, etc., content interface(s) (e.g., webpages) in order to identify the presence of third-party elements (e.g., 'malware') that have been injected into such content interface(s) and/or which are incorporated into or presented in conjunction with such interfaces when loaded, rendered, etc., by an interface presentation application 130 (e.g., a web browser). Upon identifying such third-party elements, various treatment techniques can be employed which can, for example, neutralize such third-party element(s) such that the elements do not interfere with/adversely affect the rendering of the content interface and/or the ability of a user to view, interact, etc., with it. In neutralizing such third-party elements, in certain implementations the code associated with such elements may be maintained within the content interface (e.g., by modifying parameters associated with such elements to make them invisible), such that it may be difficult and/or impossible for the third-party services responsible for the injection of such third-party elements to determine that the effects of such elements have been neutralized.

Among the technologies described herein are techniques for detecting/identifying the presence of third-party elements (e.g., 'malware') within a content interface (e.g., a webpage, mobile application, etc.) as well as techniques for treating, neutralizing, removing, etc., such identified third-party elements. It should be understood that while various detection and treatment techniques are described, such techniques are exemplary. Accordingly, it should be understood that various other techniques (including but not limited to variations and/or composites of those described herein) are also contemplated.

Figure 2:
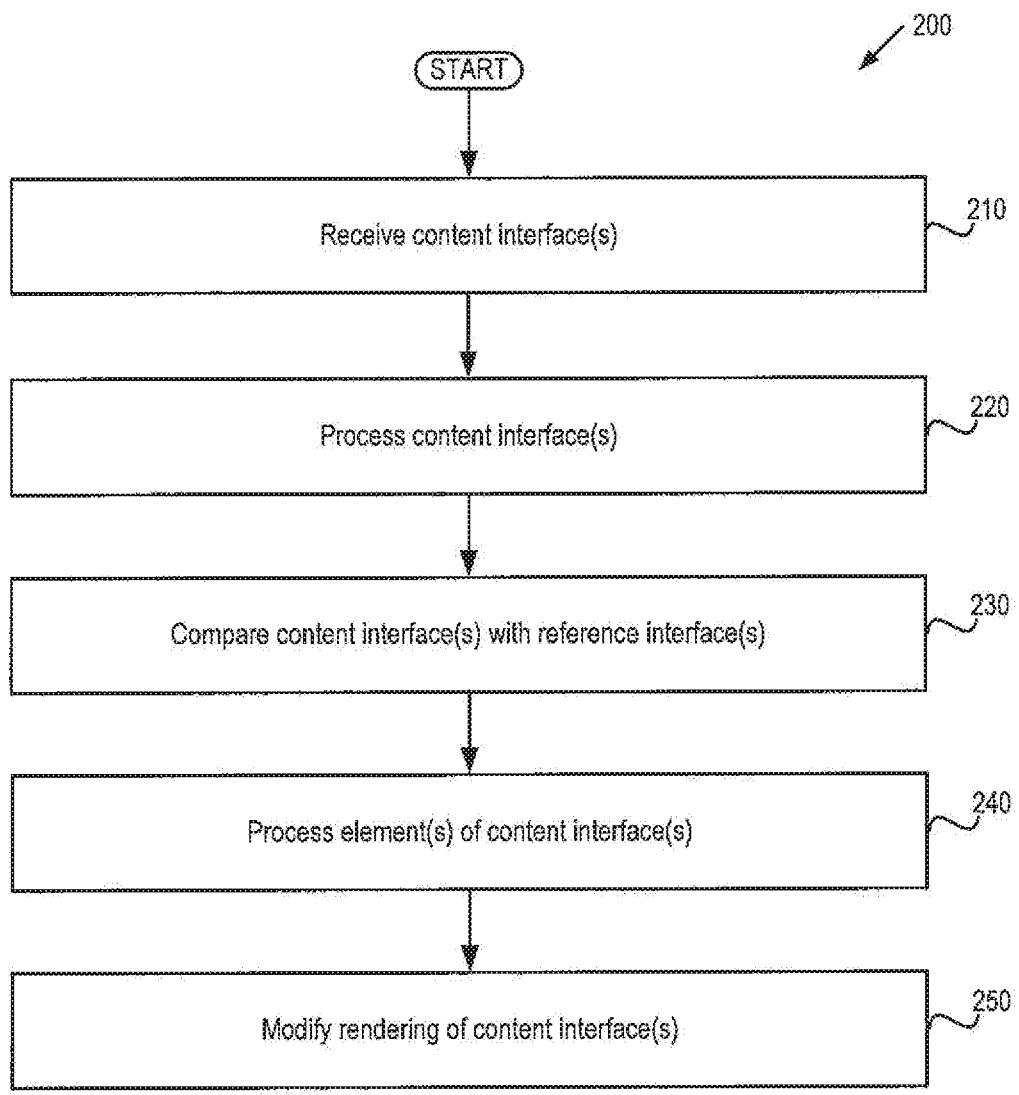
FIG. 2 depicts a flow diagram of aspects of a method for detecting and removing injected elements from content interfaces, in accordance with one implementation of the present disclosure.

FIG. 2 depicts a flow diagram of aspects of a method 200 for detecting and removing injected elements from content interfaces. The method is performed by processing logic that may comprise hardware (circuitry, dedicated logic, etc.), software (such as is run on a general purpose computer system or a dedicated machine), or a combination of both. In one implementation, the method is performed by one or more elements depicted and/or described in relation to FIG. 1 (including but not limited to user device 120), while in some other implementations, one or more blocks of FIG. 2 may be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, a content interface can be received. Such a content interface (e.g., content interface 132 as depicted in FIG. 1) can be, for example, an HTML page/webpage, a desktop application/desktop application interface, a mobile application/mobile application interface, a media presentation application/media presentation application interface or any other such content that is capable of presentation via and/or in conjunction with user device 120. In certain implementations, such a content interface can be received from a content provider. Such a content provider can be, for examples, content server 160 as depicted in FIG. 1 (e.g., a webserver, an application server, a media server, and/or any other such service, device, or application capable of storing and providing content). In one aspect, block 210 is performed by detection/treatment engine 150.

At block 220, a content interface (such as the content interface received at block 210, such as from content server 160) as perceived, processed, rendered, loaded, etc. on a device (e.g., on user device 120, such as in conjunction with interface presentation application 130, e.g., a web browser) can be processed. In doing so, various elements (e.g., third-party element 134, as depicted in FIG. 1) of the content interface 132 (as it is perceived, processed, rendered, loaded, etc. by/on device 120, e.g., by/in conjunction with interface presentation application 130) that were potentially not received from/did not originate from the content provider of the content interface (e.g., content server 160), were potentially injected by a third-party service, etc. can be identified. Examples of such elements include but are not limited to: a tag,'HTML code, iframes, scripts (e.g., JavaScript code), some other type of interface, file or code, image, text or hyperlink, etc., and/or a document object model (DOM) of the content interface 130 as rendered on the device 120 (e.g., in conjunction with interface presentation application 130). In one aspect, block 220 is performed by detection/treatment engine 150.

At block 230, the content interface (e.g., content interface 132 as perceived, processed, rendered, loaded, etc. by/on device 120, such as in conjunction with interface presentation application 130) can be compared with various corresponding reference interface(s) 182 (such as may be stored and/or provided by reference interface repository 180). Such corresponding reference interface(s) 182 can include content interfaces that originate from a content provider (e.g., content server 160) that are determined/known not to contain elements injected by a third-party service 140. By comparing the content interface 132 as perceived, processed, rendered, loaded, etc. by/on the device, those elements, aspects, characteristics, etc. of the content interface 132 as perceived, processed, rendered, loaded, etc. by/on the device that are not present in the corresponding reference interfaces 182 can be identified. In certain implementations, the referenced elements, aspects, etc. of the content interface 132 as perceived, processed, rendered, loaded, etc. by/on the device that are not present in the corresponding reference interfaces 182 can include those element(s), etc., of the content interface (as perceived, processed, rendered, loaded, etc. by/on the device) that can be determined to potentially not have been received from the content provider (e.g., content server 160)/were potentially injected by a third-party service, etc. (and thus may be third-party elements). Examples of such elements, aspects, characteristics, etc. of the content interface 132 as perceived, processed, rendered, loaded, etc. by/on the device that are not present in the corresponding reference interfaces 182 can include iframes, scripts, a document object model (DOM) of the content interface as rendered on the device, etc. In one aspect, block 230 is performed by detection/treatment engine 150.

In certain implementations, a content interface 132 as perceived, processed, rendered, loaded, etc. by/on device 120 can be compared with corresponding reference interface(s) 182 to identify elements, characteristics, attributes, etc. of the content interface 132 as rendered on the device that are capable of being injected by a third-party service 140 into the content interface 132. Additionally, in certain implementations content interface 132 as perceived, processed, rendered, loaded, etc. by/on the device 120 can be compared with corresponding reference interfaces 182 to identify elements, characteristics, etc. of the content interface 132 as perceived, processed, rendered, loaded, etc. by/on the device 120 that are determined to have been previously injected into another content interface by a third-party service 140. For example, in addition to and/or in lieu of comparing the referenced elements, characteristics, etc., detection/treatment engine 150 can use one or more rules file(s) 186 (as may be received from reference interface repository 180) to process, analyze, and/or compare the elements, characteristics, attributes, etc. of the content interface 132 as perceived, processed, rendered, loaded, etc. by/on the device that meet, correspond to, etc., elements, characteristics, attributes, etc., reflected in the rule(s) file(s) 186 (e.g., elements, characteristics, etc., reflected in the rule(s) file(s) that correspond to the presence of third party element(s)).

In certain implementations, elements, characteristics, attributes, etc., from the content interface as perceived, processed, rendered, loaded, etc. by/on the device that are capable of being injected by a third-party service can be compared with elements, characteristics, attributes, etc., from various corresponding reference interface(s) 182 to identify element(s), characteristics, attributes, etc., from the content interface as perceived, processed, rendered, loaded, etc. by/on the device that are capable of being injected by a third-party service that are not present in the one or more corresponding reference interfaces 182. For example, identifying an iframe or a script within a webpage as rendered/loaded on a device that is not present in a corresponding (i.e., 'pristine') reference page (e.g., of a same, similar, and/or corresponding page) can indicate that the referenced iframe/script is a third-party element (e.g., 'malware').

By way of illustration, FIG. 3A depicts exemplary HTML code corresponding to a content interface 132 (e.g., a webpage) as rendered/loaded on the device 120. As depicted in FIG. 3A, based on a comparison with various reference interfaces 182 and/or rules files 186, various third-party elements 134 (e.g., an iframe and a script, as shown in FIG. 3A) can be identified (e.g., based on the absence of such elements in the reference interfaces and/or that such elements meet/correspond to rule(s) in the rules file(s) that dictate/define characteristics, attributes, etc. of third-party elements).

In certain implementations, various attributes of the referenced elements, characteristics, etc. from the content interface 132 as perceived, processed, rendered, loaded, etc. by/on the device 120 that are capable of being injected by a third-party service 140 can be compared with attributes of various elements, characteristics, etc. from corresponding reference interfaces 182. In doing so, those elements from the content interface 132 as rendered on the device 120 that are capable of being injected by a third-party service 140 that are not present in the one or more corresponding reference interfaces 182 can be identified. Examples of such attributes (e.g., attributes of elements from content interface 132 as perceived, processed, rendered, loaded, etc. by/on the device 120 that are capable of being injected by a third-party service 140 can include but are not limited to: a relative positioning of the referenced elements, a size of the referenced elements, and/or a shape of the referenced elements. Additionally, in certain implementations the referenced elements, characteristics, etc. from the content interface 132 as perceived, processed, rendered, loaded, etc. by/on the device 120 that are capable of being injected by a third-party service 140 can be compared with various elements, characteristics, etc. from one or more corresponding reference interfaces 182 and/or one or more rules files 186 in order to identify elements from the content interface 132 as rendered on the device 120 that are capable of being injected by a third-party service 140 that overlay one or more elements of the content interface (e.g., original elements of the content interface, such as may be provided by content server 160).

By way of illustration, FIG. 3B depicts exemplary HTML code corresponding to a content interface 132 (e.g., a webpage) as perceived, processed, rendered, loaded, etc. by/on the device 120. As depicted in FIG. 3B, based on a comparison with various reference interfaces 182 and/or rules files 186, one or more attributes (e.g., a relative 'z-index' position of a webpage element, as shown in FIG. 3B) can be used/considered in identifying various third-party elements 134 (e.g., the presence of such attributes, which may (a) not be reflected in the reference interfaces and/or (b) may meet/correspond to rule(s) in the rules file(s) that dictate/define attributes, etc. of third-party elements can indicate that the associated elements are third-party elements 134, e.g., 'malware').

By way of further illustration, FIG. 3C depicts exemplary HTML code corresponding to a content interface 132 (e.g., a webpage) as perceived, processed, rendered, loaded, etc. by/on the device 120. As depicted in FIG. 3C, based on a comparison with various reference interfaces 182 and/or rules files 186, an attribute 310 (e.g., at="a", as shown in FIG. 3C) can be used/considered in identifying various third-party elements 134 (e.g., the presence of such an attributes, which may (a) not be reflected in the reference interfaces and/or (b) may meet/correspond to rule(s) in the rules file(s) that dictate/define attributes, etc. of third-party elements can indicate that the associated elements are third-party elements 134, e.g., 'malware').

In certain implementations, various elements, characteristics, etc. from the content interface 132 as perceived, processed, rendered, loaded, etc. by/on device 120 that are capable of being injected by a third-party service 140 can be compared with various elements, characteristics, etc. from one or more corresponding reference interfaces 182 and/or one or more rules files 186 in order to identify elements, characteristics, etc. from the content interface 132 as rendered on the device 120 that are capable of being injected by a third-party service 140 that contain one or more source domains (e.g., a source domain that is not included in a set of valid source domains). For example, a rules file 186 can provide a 'whitelist' of domains that are appropriate/safe source domains to be included within content interface 132 when rendered/loaded. Accordingly, a source domain within content interface 132 that is not among the 'whitelisted' domains can be identified as a third-party element 134 (e.g., 'malware'). By way of illustration, FIG. 3D depicts exemplary HTML code corresponding to a content interface 132 (e.g., a webpage) as rendered/loaded on the device 120. As depicted in FIG. 3D, based on a comparison with various reference interfaces 182 and/or rules files 186, a third-party element 134 can be identified within the code that makes up content interface 132 based on the inclusion of a source domain ('adserver.com') that is not among various 'whitelisted' source domains.

In certain implementations, various elements, characteristics, etc. from the content interface 132 as perceived, processed, rendered, loaded, etc. by/on a device 120 that are capable of being injected by a third-party service 140 can be compared with various elements, characteristics, etc. from corresponding reference interfaces 182 and/or one or more rules files 186 to identify elements from the content interface 132 as rendered on the device 120 that are capable of being injected by a third-party service 140 that are rendered/loaded after expiration of a time interval (e.g., after a time interval or delay after various other elements of the content interface 132 have already been loaded/rendered). That is, it should be understood that certain types of third-party elements (e.g., 'malware') can be configured to load, render, appear, etc. (e.g., within interface presentation application 130) after a time interval or delay from the initial loading/rendering of other elements of the content interface (e.g., the original content elements as provided by content server 160). Accordingly, upon identifying various elements in the content interface that are to be rendered, loaded, presented, etc., after a time delay (e.g., a time delay from the loading, rendering, etc., of other content elements), such delayed elements can be identified as third party elements 134 (as may be injected by third-party service 140).

In certain implementations, various elements, characteristics, etc. from the content interface 132 as perceived, processed, rendered, loaded, etc. by/on the device 120 that are capable of being injected by a third-party service 140 can be compared with one or more elements, characteristics, etc. from one or more corresponding reference interfaces 182 and/or one or more rules files 186 to identify elements from the content interface as perceived, processed, rendered, loaded, etc. by/on the device 120 that are capable of being injected by a third-party service 140 that modify and/or remove one or more elements of the content interface. For example, certain types of third-party elements (e.g., 'malware') can be configured to modify, alter, and/or remove various aspects, attributes, etc., of various elements of a content interface (and/or the elements themselves) (e.g., within interface presentation application 130), such as initially (e.g., at the time of rendering/loading) and/or after a time interval or delay from the initial loading/rendering of such elements. Accordingly, upon identifying various elements in the content interface that are to be altered, modified, removed etc., initially and/or after a time delay (e.g., a time delay from the initial loading, rendering, etc., of such elements), such elements that are to be modified/altered/removed (and/or those that are, for example, operative to remove other elements, such as those that were originally provided by content server 160) can be identified as third party elements 134 (as may be injected by third-party service 140).

At this juncture it should be noted that, as has been described herein, various third-party elements 134 can be configured to modify, alter, etc., aspects of a content interface 132 after a time interval or delay has passed. Stated differently, such third-party elements can be configured such that an initial loading, rendering, presentation, etc. of the content interface 132 may not demonstrate signs of the third-party element 134, despite the presence of such element within the content interface. Accordingly, in certain implementations detection/treatment engine 150 can be configured to sample and re-sample the content of content interface 132 as presented within interface presentation application 132 at several intervals (e.g., every second) and to perform the various detection/identification techniques described herein. In doing so, those third-party elements 134 that only manifest themselves after some time delay can still be identified. Additionally, in certain implementations the referenced sampling by detection/treatment engine 150 can be configured to stop after a defined period of time (e.g., 10 seconds) and/or a number of samples (e.g., 10 samples of the content interface), on account of the fact that after a certain period of time has elapsed without the manifestation of a third-party element 134, it is highly unlikely that such a third-party element is present in the content interface 132. Moreover, in certain implementations such repeated sampling of a content interface 132 by detection/treatment engine 150 can be advantageous even in a scenario in which a third-party element 134 is identified (e.g., on an initial sample of the content interface). For example, upon detecting/identifying such a party element 134 and subsequently treating/neutralizing such an element (e.g., in a manner described herein, such as at block 250), the content interface 132 (as treated) can subsequently be sampled additional times (e.g., for 10 more seconds, 10 more samples, etc.) in order to determine whether (a) the treatment itself was successful and/or (b) whether other third-party elements may be manifesting themselves.

At block 240, those element(s) 134 identified at block 230 (e.g., as third-party elements) can be processed. In doing so, a manner in which such identified third-party elements affect the perception, processing, rendering, loading, presentation, etc. of the originally provided content interface 132 on the device 120. In one aspect, block 240 is performed by detection/treatment engine 150.

By way of illustration, in certain implementations the identified third-party element(s) 134 can be processed to determine whether the third-party element is implementing a 'listener,' which may, for example, 'listen' for various inputs to be provided in relation to the content interface 132 (e.g., 'clicks' or any other such selections). Accordingly, upon identifying such a 'listener' (and/or any other such manners in which the third party elements 134 affect the rendering, loading, and/or presentation of content interface 132), a modification or treatment can be identified/determined and implemented with respect to the content interface 132, such as is described herein.

At block 250, a perception, processing, rendering, loading, etc. of a content interface (e.g., content interface 132) on the device 120 can be modified. In certain implementations, such a perception, processing, rendering, loading, etc. can be modified based on/in response to a determination/identification of the manner in which the various third-party elements 134 affect the perception, processing, rendering, loading, etc. of the content interface 132 (e.g., in a manner determined to be effective in neutralizing/removing the effects of the third-party element). In other implementations, an initial treatment technique (which modifies aspects of content interface 132) can be selected and employed in relation to the content interface 132. The results of such a technique can then be observed/processed/analyzed and based on such results one or more other treatment technique(s) can be employed. Additionally, in certain implementations such technique(s) can be defined/dictated by rules file(s) 186 (e.g., a rules file 186 can dictate that, upon detecting a particular type of third-party element, a certain treatment technique or techniques should be employed in response). In one aspect, block 250 is performed by detection/treatment engine 150.

In certain implementations, the referenced treatment techniques can include the modification, alteration, addition, and/or removal of various parameters associated with the identified third-party element 134. Examples of such parameters include but are not limited to: coordinates that pertain/correspond to a relative orientation/arrangement of the third-party element(s) 134 (e.g., modifying parameter(s) associated with x, y, and/or z coordinate(s) of the third-party element(s) such that the third party element(s) are 'pushed' outside the viewable scope of the display), visibility parameter(s) that pertain/correspond to a visibility of the third-party element(s) as presented in interface presentation application 130, and/or size parameter(s) that pertain/correspond to a visibility of the third-party element(s) as presented in interface presentation application 130.

By way of illustration, FIG. 4A depicts exemplary HTML code corresponding to a content interface 132 (e.g., a webpage) as perceived, processed, rendered, loaded, etc. by/on the device 120. As depicted in FIG. 4A, upon identifying the presence of third-party element 134 (here, an iframe) a parameter can be added to the identified third-party element 134 (e.g., by detection/treatment engine 150). For example, as shown in FIG. 4A, a parameter 410 such as an invisibility parameter ('visibility/hidden') can be added to the iframe. In doing so, though the code corresponding to the third-party element 134 does remain within the content interface 132, the effects of such third-party element 134 are neutralized with respect to interference with/interruption of the depiction/display of the content interface 132 within interface presentation application 130, as the third-party element 134 has been made invisible and is thus not perceptible to a user of user device 120. Additionally, by maintaining the presence of the code of the third-party element 134 within content interface 132, it may be difficult and/or impossible for third-party service 140 (e.g., the service, application, etc. that injected the third-party element 134) to determine that the effects of the third-party element 134 have been neutralized.

By way of further illustration, FIG. 4B depicts exemplary HTML code corresponding to a content interface 132 (e.g., a webpage) as perceived, processed, rendered, loaded, etc. by/on the device 120. As depicted in FIG. 4B, upon identifying the presence of third-party element 134 (here, an iframe) a parameter associated with the identified third-party element 134 can be deleted/removed (e.g., by detection/treatment engine 150). For example, as shown in FIG. 4B, a parameter 420 such as a size parameter ('width:0px . . . ') can be removed from the third-party element 134 code. Additionally, FIG. 4C depicts exemplary HTML code corresponding to a content interface 132 (e.g., a webpage) as perceived, processed, rendered, loaded, etc. by/on the device 120. As depicted in FIG. 4C, upon identifying the presence of third-party element 134 (here, an iframe) a parameter associated with the identified third-party element 134 can be deleted/removed (e.g., by detection/treatment engine 150). For example, as shown in FIG. 4C, a parameter 430 such as display/block' can be removed from the third-party element 134 code. In doing so, though the code corresponding to the third-party element 134 does remain within the content interface 132, the effects of such third-party element(s) 134 are neutralized with respect to interference with/interruption of the depiction/display of the content interface 132 within interface presentation application 130, as the third-party element 134 will not be perceptible to a user of user device 120 (due to the absence of the referenced parameter(s) 420 and/or 430). Additionally, by maintaining the presence of the code of the third-party element 134 within content interface 132, it may be difficult and/or impossible for third-party service 140 (e.g., the service, application, etc. that injected the third-party element 134) to determine that the effects of the third-party element 134 have been neutralized.

In certain implementations, the referenced treatment techniques can include removal/deletion of the identified third-party element 134. By way of illustration, FIG. 4D depicts exemplary HTML code corresponding to a content interface 132 (e.g., a webpage) as perceived, processed, rendered, loaded, etc. by/on the device 120. As, depicted in FIG. 4D, upon identifying the presence of third-party element 134 (here, an iframe), the identified third-party element 134 can be removed/deleted from content interface 132 (e.g., by detection/treatment engine 150, such as by accessing the element itself or its parent on the HTML DOM structure). In doing so, the effects of such third-party element 134 are neutralized with respect to interference with/interruption of the depiction/display of the content interface 132 within interface presentation application 130.

Additionally, in certain implementations one or more substitute elements can be generated (e.g., by detection/treatment engine 150), e.g., based on the identified third-party element(s) 134. Such identified third-party element(s) 134 can then be replaced with the generated substitute elements (e.g., by detection/treatment engine 150).

Moreover, in certain implementations, one or more elements that are configured to encapsulate/wrap/nest the identified third-party element(s) 134 and/or to absorb/quarantine various outputs provided by the identified third-party element(s) 134. Such encapsulating/wrapping/nesting/absorbing elements can be further associated with and/or otherwise incorporate an invisibility attribute. In doing so, the generated encapsulating/wrapping/nesting/absorbing element(s) (which can encapsulate, etc., third-party element(s) 134) can be made invisible and thus not presented in interface presentation application 130, thereby also making the third-party element(s) 134 invisible (by virtue of the referenced encapsulation, etc.).

In certain implementations, content interface 132 can be modified (e.g., by detection/treatment engine 150) to absorb the inputs provided in relation to the content interface 132 (e.g., 'clicks' or any other such selections) prior to the receipt of such inputs by various third-party element(s) 134 (e.g., 'listeners,' such as are described at block 240). In doing so, the effects of the referenced third-party element(s) 134 can be neutralized, as the third-party element(s) 134 will not receive the input(s) they are configured to be 'listening' for.

It should be understood that the described treatment techniques are exemplary and that any number of other such techniques are similarly contemplated. For example, in certain implementations, based on an identification/detection of a third-party element 134, an element that shares one or more values, attributes, etc. (e.g., 'id') with the third-party element 134 can be generated (e.g., by detection/treatment engine 150) and provided in advance of the rendering/loading of the third-party element 134. By way of further example, in certain implementations, based on an identification/detection of a third-party element 134, detection/treatment engine 150 can replace such third-party element 134 with an element that shares one or more values, attributes, etc. (e.g., 'id') with the third-party element 134 (e.g., subsequent to the third-party element 134 being perceived, processed, rendered, loaded, etc.).

It should also be noted that while the technologies described herein are illustrated primarily with respect to 'malware' detection/treatment, the described technologies can also be implemented in any number of additional or alternative settings or contexts and towards any number of additional objectives.

Figure 5:
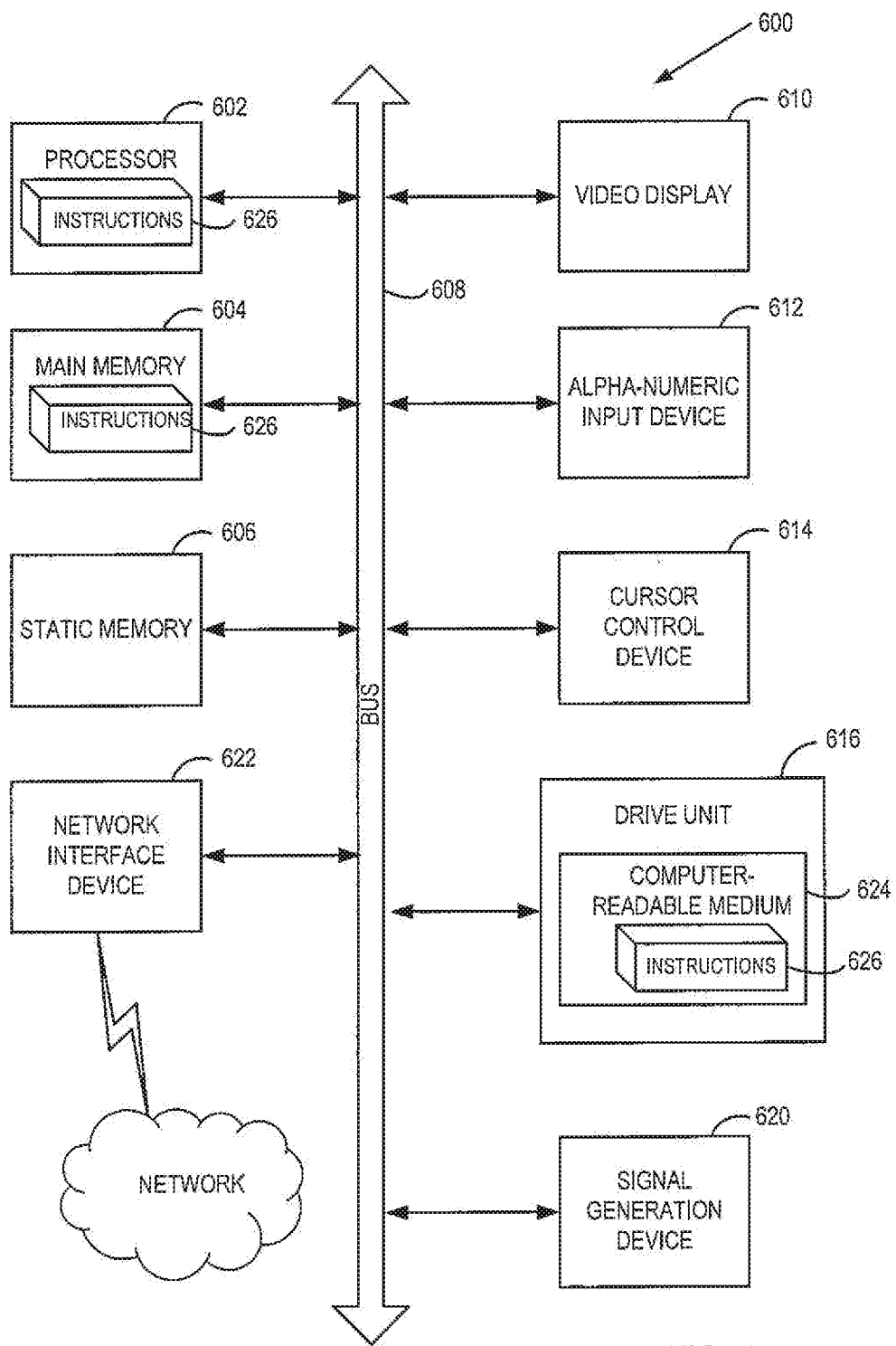
FIG. 5 depicts a block diagram of an illustrative computer system operating in accordance with aspects and implementations of the present disclosure.

FIG. 5 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by server machine 120, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "comparing," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform certain operations. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to practically any type of data. The scope of the disclosure should, therefore, be determined with reference to the appended claims, along with the full scope of equivalents to which such claims are entitled.

What is claimed is:

1. A method comprising:
receiving a webpage associated with a content provider, wherein the webpage comprises a plurality of content elements;
comparing, by a processing device, the webpage loaded by the device with one or more reference webpages originating from the content provider to detect a first malware element of the plurality of content elements of the webpage loaded by the device that is not present in the one or more reference webpages, wherein the first malware element is loaded after expiration of a time interval subsequent to a loading of one or more other content elements of the webpage; and
modifying a first parameter of code associated with the first malware element to interrupt a display of the first malware element via the webpage on the device, wherein at least a portion of the code associated with the first malware element is maintained.

2. The method of claim 1, further comprising identifying the first malware element is capable of being injected by a third-party service into the webpage.

3. The method of claim 1, further comprising identifying the first malware element was previously injected into another webpage by a third-party service.

4. The method of claim 1, further comprising identifying the first malware element is capable of being injected by a third-party service and not present in the one or more corresponding reference interfaces.

5. The method of claim 4, further comprising comparing a first attribute of the first malware element with one or more attributes of one or more elements from the one or more reference webpages, wherein the first attribute comprises at least one of: a position of the first malware element, a size of the first malware element, or a shape of the first malware element.

6. The method of claim 1, further comprising identifying the first malware element comprises one or more source domains that are not included in a set of valid source domains.

7. The method of claim 1, further comprising determining the first malware element overlays one or more content elements of the webpage.

8. The method of claim 1, further comprising identifying a removal of one or more content elements of the webpage.

9. The method of claim 1, further comprising identifying a removal of one or more content elements of the webpage after expiration of a time interval.

10. The method of claim 1, wherein the first parameter comprises one or more coordinates pertaining to an orientation of the first malware element.

11. The method of claim 1, further comprising removing one or more parameters of the first malware element.

12. The method of claim 1, further comprising replacing a content element of the webpage with a substitute content element.

13. The method of claim 1, further comprising generating a content element that encapsulates the first malware element.

14. The method of claim 13, wherein the content element comprises an invisibility attribute.

15. The method of claim 1, further comprising determining the first malware element is listening for one or more inputs to be provided in relation to the webpage.

16. The method of claim 15, further comprising modifying the webpage to process an input prior to processing of the input by the first malware element.

17. A system comprising:
a memory; and
a processing device, coupled to the memory, to:
receive a webpage associated with a content provider, wherein the webpage comprises a plurality of elements;
compare the webpage loaded by the device with one or more corresponding reference webpages originating from the content provider to detect a first malware element of the plurality of elements of the webpage loaded by the device that is not present in the one or more corresponding reference webpages, wherein an element of the plurality of elements is removed after expiration of a time interval; and
modify a first parameter of code associated with the first malware element to interrupt a display of the first malware element via the webpage on the device, wherein at least a portion of the code associated with the first malware element is maintained.

18. A non-transitory computer readable medium having instructions stored thereon that, when executed by a processing device, cause the processing device to:
receive a webpage associated with a content provider, wherein the webpage comprises a plurality of elements;
compare the webpage loaded by the device with one or more corresponding reference webpages originating from the content provider to detect a first malware element of the plurality of elements of the webpage loaded by the device that is not present in the one or more corresponding reference webpages, wherein an element of the plurality of elements is removed after expiration of a time interval; and
modify a first parameter of code associated with the first malware element to interrupt a display of the first malware element via the webpage on the device, wherein at least a portion of the code associated with the first malware element is maintained.

* * * * *